United States Patent [19]

Lindsay

[11] Patent Number: 4,782,366

[45] Date of Patent: Nov. 1, 1988

[54] NUMBER PRINTING DEVICE FOR PHOTOCOPIERS

[76] Inventor: Steve Lindsay, 3923 N.W. Brickyard Rd., Topeka, Kans. 66618

[21] Appl. No.: 45,374

[22] Filed: May 4, 1987

[51] Int. Cl.[4] .............................................. G03B 27/52

[52] U.S. Cl. .......................................... 355/40; 355/75

[58] Field of Search ............................... 355/40, 41, 75

[56] References Cited

U.S. PATENT DOCUMENTS 4,029,414 6/1977 Rubenstein ............................ 355/40

*Primary Examiner*—Monroe H. Hayes

*Attorney, Agent, or Firm*—Kokjer, Kircher, Bradley, Wharton, Bowman & Johnson

[57] ABSTRACT

A device for consecutively numbering photocopies produced by a conventional zerographic photocopy machine. A multiple section chase is placed on a transparency which is to be photocopied and carries a counter head which provides a numerical display. The chase also carries a photocell which sense the light emitted each time the light bar of the photocopier is swept past the transparency to produce a copy. The output signal from the photocell is used to increment the count state of the counter each time a copy is made. The numerical display is copied along with the transparency so that the successive photocopies made by the machine are imprinted with sequential numbers. The chase sections have a dovetail tongue and groove construction which allows the chase to be properly sized and also permits the counter head to be located at any desired position and orientation the chase.

20 Claims, 2 Drawing Sheets

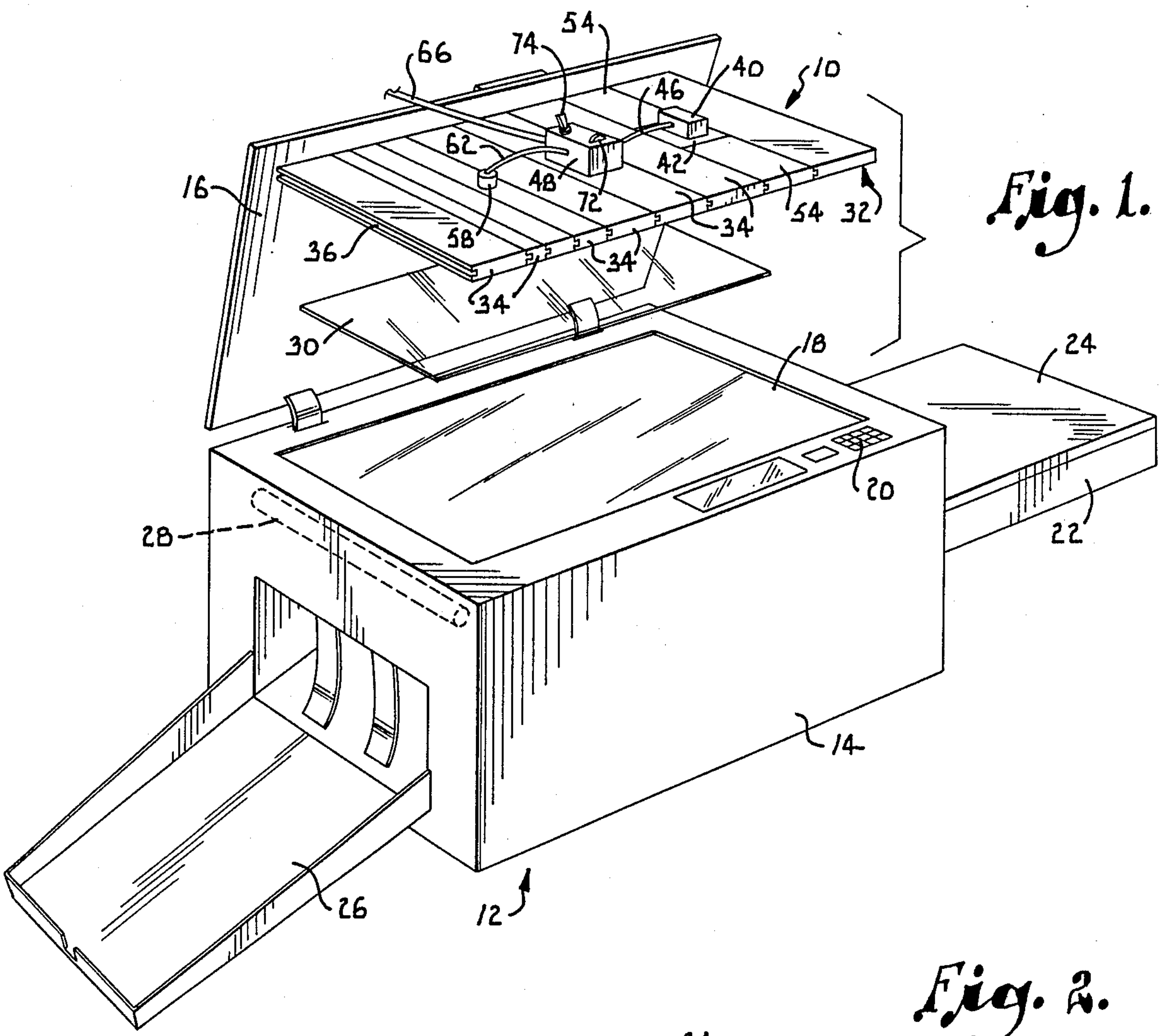
*Fig. 1.*
*Fig. 2.*
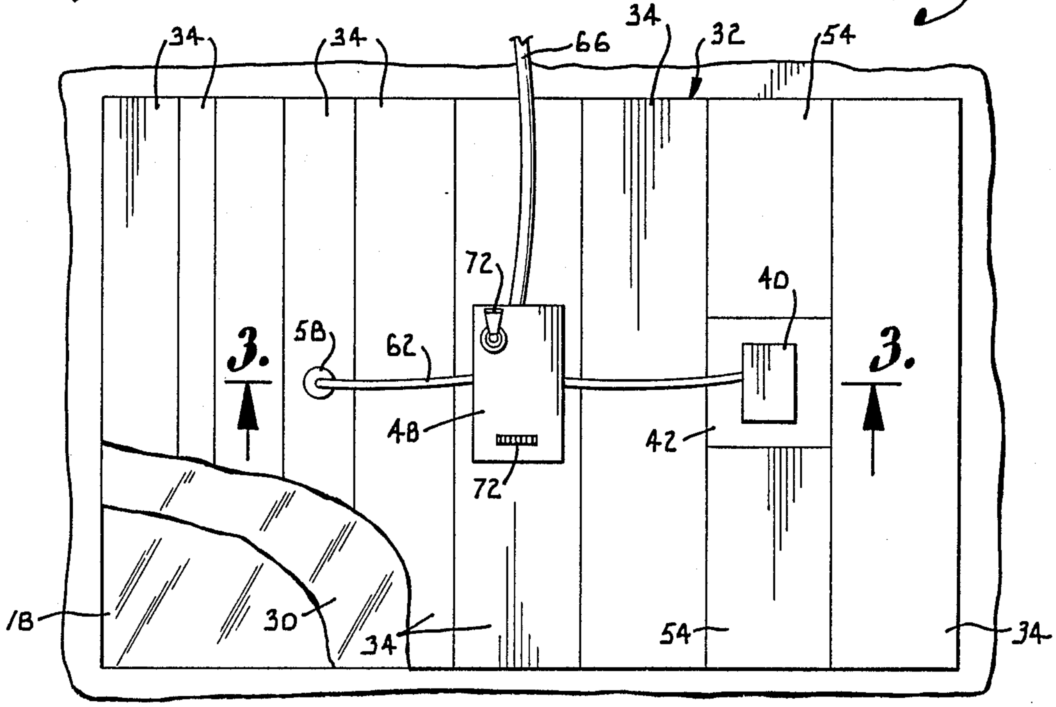

NUMBER PRINTING DEVICE FOR PHOTOCOPIERS

BACKGROUND AND SUMMARY OF THE INVENTION

This invention relates generally to the field of photocopying and more particularly to a device which prints consecutive numbers on copies of documents produced by a conventional photocopier.

Xerographic photocopy machines have long been widely used in offices and elsewhere and have been used with increasing frequency in small printing shops. However, documents which are identical in content and differ from one another only in the number or numbers that are printed on them cannot be conveniently produced on a photocopy machine because the machine lacks the ability to print numbers on the copies it makes. Examples of this type of document are tickets, purchase orders, invoices, carbonless forms and bank checks. It is necessary for the documents to be printed entirely by a printing press or photocopied and then provided with consecutive numbers by a printing press or other expensive printing machine. In either case, the cost and inconvenience involved in making the copies is a considerable burden.

Accordingly, there is a need for a device that permits a conventional photocopy machine to produce consecutively numbered photocopies of documents. The present invention is aimed principally at meeting that need.

More specifically, it is an important object of the invention to provide a device that can be used in conjunction with a photocopier in a manner to imprint sequential numbers on document copies that are produced by the machine.

Another object of the invention is to provide a device of the character described which automatically increments the numbers which are printed on successive copies.

A further object of the invention is to provide a device of the character described which is constructed to allow the numbers that are printed on the document copies to be placed at virtually any selected location on the copies.

Yet another object of the invention is to provide a device of the character described in which the printed numbers can be oriented as desired on the copies.

An additional object of the invention is to provide a device of the character described which is suitable for use with different sizes and styles of photocopy machines.

A still further object of the invention is to provide a device of the character described which is constructed in a simple and economical manner and which is safe and easy to use.

Other and further objects of the invention, together with the features of novelty appurtenant thereto, will appear in the course of the following description.

DETAILED DESCRIPTION OF THE INVENTION

In the accompanying drawings which form a part of the specification and are to be read in conjunction therewith and in which like reference numerals are used to indicate like parts in the various views:

FIG. 1 is a perspective view of a photocopy machine and showing the device of the present invention and a transparency which is to be copied;

FIG. 2 is a top plan view showing the device and the transparency applied to the transparent panel of the photocopy machine, with portions broken away for purposes of illustration;

Figure 3:
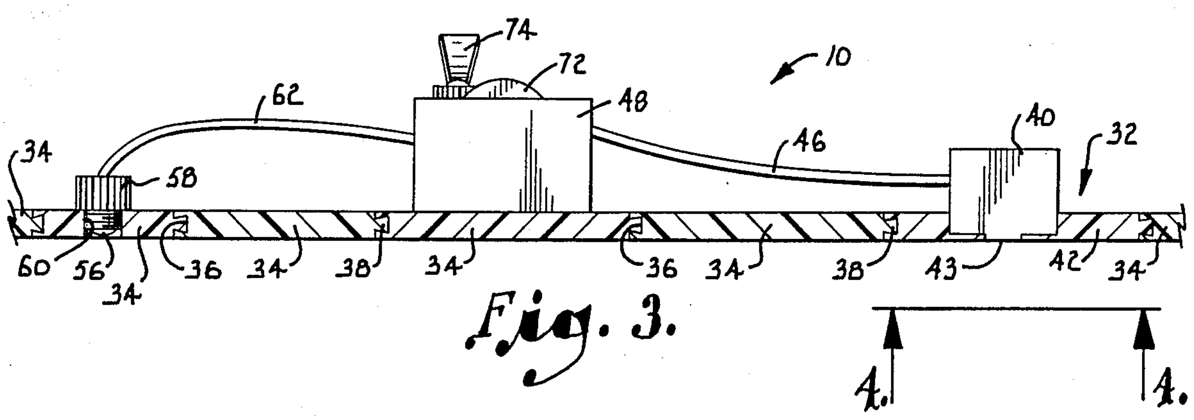
FIG. 3 is a fragmentary sectional view on an enlarged scale taken generally along line 3—3 of FIG. 2 in the direction of the arrows.

Referring now to the drawings in more detail and initially to FIG. 1, numeral 10 generally designates a number printing device constructed according to a preferred embodiment of the present invention. The device 10 is used with a conventional xerographic photocopy machine 12 having a box-like cabinet 14 and a hinged cover 16 which may be closed upon a horizontal transparent panel 18 which occupies the top of the cabinet and which receives the material that is to be copied. The machine also includes controls 20 which control its operation. A supply tray 22 is mounted on one end of the machine and holds a supply of blank paper 24 on which material is copied. The copies are discharged from the machine into another tray 26 located on the end of the machine opposite the supply tray 22. A light bar 28 is swept along the underside of the transparent panel 18 each time a photocopy is produced by the machine. The machine is conventional and operates to produce photocopies in a manner well known to those skilled in the art.

It should be understood that the photocopy machine 12 which is illustrated in FIG. 1 is only exemplary of the types of machines with which the device 10 can be used. It is also to be understood that the device can also be used with other types and styles of photocopiers, including laser photocopy machines and copiers equipped with continuous forms handling attachments.

The device 10 functions to automatically print consecutive numbers on successive photocopies that are produced by the machine 12. The material that is to be photocopied is first transferred in a conventional manner onto a rectangular transparency 30 which may be placed face down on top of the transparent panel 18. The transparency 30 should bear a "positive" image of the material that is to be copied, although a negative transparency can be used with some types of machines.

The number printing device 10 of the present invention includes a rectangular chase which is generally identified by reference numeral 32. The chase is formed by a plurality of chase sections which take the form of rectangular slats 34 connected edge to edge. As best shown in FIG. 3, one of the long edges of each slat 34 is provided with a dovetail groove 36, while the opposite long edge of the slat is provided with a dovetail tongue 38 having a size and shape complemental to that of the groove 36. Due to this dovetail construction, the slats can be fitted together by sliding the tongue 38 of each slat into the groove 36 of the adjacent slat.

As best shown in FIGS. 1 and 2, the slats 34 all have the same length but vary in their widths. Accordingly, the overall length of the chase 32 can be adjusted as desired by connecting together a suitable number and size of the slats 34. It is contemplated that different sets of slats can be provided, with each set including slats that have the same length as the other slats in the set but a different length than the slats in other sets. Thus, the width of the chase can be varied by selecting a suitable set of slats. The slats 34 are preferably opaque and can be constructed of rigid plastic or any other suitable material.

Figure 4:
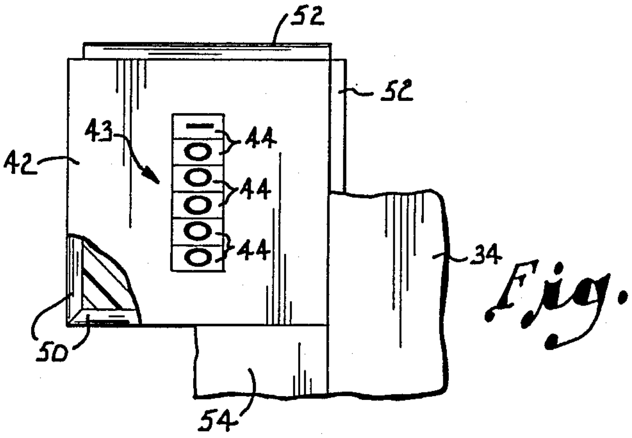
FIG. 4 is a fragmentary bottom plan view on an enlarged scale taken generally along line 4—4 of FIG. 3 in the direction of the arrows, with portions broken away for purposes of illustration.

The number printing device 10 includes a counter having a box like counter head 40 mounted on a specially constructed slat 42. The counter head 40 has a downwardly facing numerical display 43 which is best shown in FIG. 4. The display includes a plurality of digits 44 which are arranged consecutively one after another on the bottom face of the counter head 40 in order to display a multiple digit arabic number. Each of the digits 44 is carried on a rotatable wheel which carries the consecutive single digit numbers 0-9 (or 9-0 in the case of a reverse numbering scheme) The digits 44 occupy the O's, 10's, 100's, etc. digits in the number which is displayed by the counter head, and the adjacent wheels are mechanically connected such that the next higher digit is incremented by one each time the lower digit changes from 9 to 0. The mechanism which creates the numerical display is conventional, and its details are not a part of the present invention.

The display 43 is incremented by one each time an electrical signal is applied to the counter head 40 along an electrical conductor 46 which extends to the counter head from a control box 48 mounted on one of the slats 34. As shown in FIG. 3, the display 43 projects through slat 42 and is exposed through the transparency 30 to the transparent panel 18 of the photocopy machine.

The slat 42 which carries the counter head 40 is specially constructed to permit the display to be located at any desired position on the chase 32. As best shown in FIG. 4, the slat 42 is square and has a pair of dovetail grooves 50 formed in two of its adjacent edges. The other two edges are provided with mating dovetail tongues 52. The tongues 52 are identical in shape to the tongues 38 in the other slats 34, while the grooves 50 are likewise shaped identically to the other dovetail grooves 36.

By placing one of the tongues 52 in the groove 36 of the adjacent slot 34, the special slat 42 can be oriented such that the display is oriented transversely on the chase 32. Alternatively, the other tongue 52 can be fitted in the groove 36 of the adjacent slat 34, and this orients the slat 42 at a rotative position that is offset by 90° from its other position. In this orientation of slat 42, the display is oriented longitudinally on chase 32. One of the grooves 50 receives the tongue 38 of the slat 34 on the other side of the special slat 42.

As best shown in FIGS. 1 and 2, special shaped slats 54 are used to "fill in" between slat 42 and the opposite side edges of the chase 32. Fill in strips 54 having various lengths can be provided, thus permitting slat 42 to be located at any desired position transversely on the chase. One of the fill in strips 54 has a dovetail tongue on its edge located adjacent the special slat 42, while the other fill in slat 54 has a groove in order to mate with one of the tongues 52 of slat 42. The long edges of slat 54 are provided with dovetail grooves and tongue in order to interfit with the adjacent slats 34. It should be noted that the special slat 42 can also be located at any desired position longitudinally on the chase by suitably arranging slats 34 relative to it and by properly arranging different widths of slats.

The device 10 includes a photoelectric cell 56 (See FIG. 3) which is carried on the lower end of an externally threaded plug 58. The plug 58 may be threaded into an internally threaded passage 60 which is formed through one of the slats 34, preferably near its center. The photocell 56 is exposed through the transparency 30 and the transparent panel 18 to the light which is emitted by the light bar 28 each time it is swept beneath the transparent panel 18. The resulting signal generated by the photocell is transmitted along an electrical conductor 62 to the control box 48.

Figure 5:
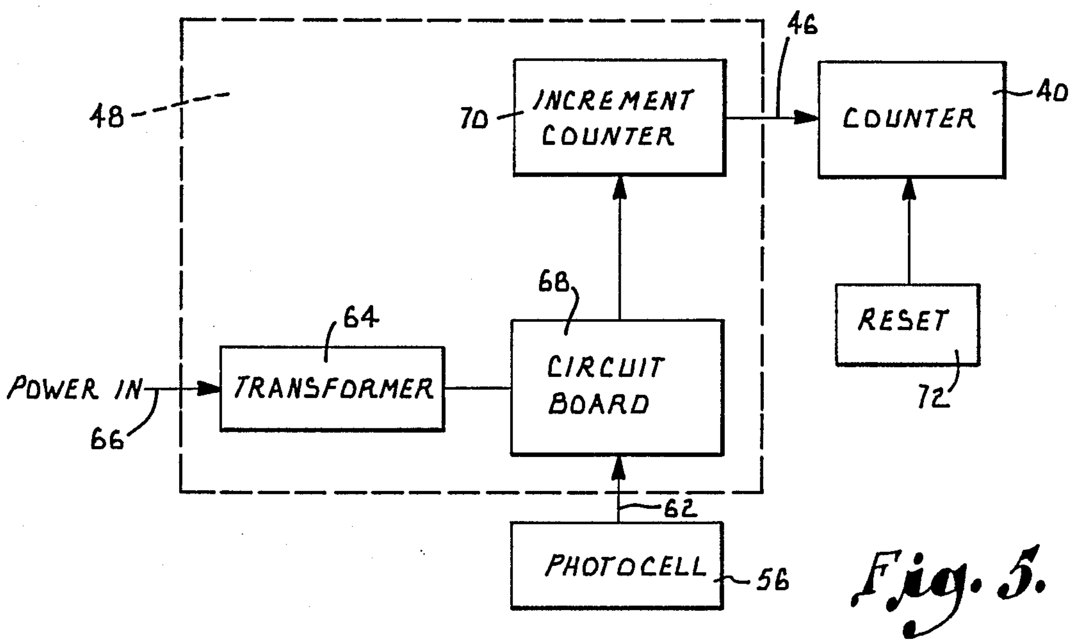
FIG. 5 is a functional block diagram of the control system for the device.

Referring now to FIG. 5, the control box 48 contains a transformer 64 which receives power from a power cord 66 which preferably carries on its end a plug that may be connected with a conventional electrical receptacle. The control box 48 also contains a circuit board 68 which receives power from the transformer 64 and which receives the electrical signals from the photocell 56. The circuit board 68 suitably controls the increment counter block 70 which acts to increment the count state of the counter head 40 by one each time a signal is received from the circuit board. It should be pointed out that the incrementing of the count state can occur for each two signals, or each three signals or virtually any other number of signals. The counter 40 may be reset to a zero count state (or any other desired count state) by turning a thumbwheel 72 located on the control box 48. The control box is provided with a two position toggle switch 74 which is used to turn the device 10 on and off.

In use of the device 10, the transparency 30 is first placed face down on the transparent panel 18 of the photocopy machine. The chase is then placed on top of the transparency 30 with the counter head 40 positioned in the location and orientation desired for the numbers which are to be printed on the photocopies. The power cord 66 is connected with a source of electrical power, and the toggle switch 74 is placed in the on position. The counter should ordinarily be reset to the zero count state at the outset. The counter can also be reset for "skip numbering" in the case of multiple heads for multiple forms on one sheet.

The cover 16 may then be closed on the chase and transparency, and the photocopy machine 12 may be operated to produce the desired number of copies, each of which will constitute a copy of the material on the transparency 30.

Each time a copy is produced by the machine 12, the light bar 28 is swept beneath the transparent panel 18. The light that is thus emitted by the light bar is sensed by the photocell 56, and the photocell applies an electrical signal to the circuit board 68. Each signal that is received by the circuit board 68 is used to increment the count state of the counter head 40 by one by means of the increment counter block 70. Since the display 43 is exposed through the transparency 30 to the glass panel 18, the number which is displayed on the counter head is copied onto each photocopy that is made by the machine 12.

Because the counter is incremented by one each time a photocopy is made, sequential numbers are printed by the device on successive photocopies that are made by the machine. For example, if 100 photocopies are made of the transparency 30, the photocopies are consecutively numbered from 000001 to 000100.

It should be noted that the control box 48 need not be mounted on the chase 10 but can instead be located remotely and connected with the photocell 56 and the counter head 40 by electrical conductors. It should also be noted that a device other than the photocell can be used to increment the counter each time a photocopy is made. For example, with a laser copier that does not have a light bar, a movement sensor (not shown) or other device can be used to sense the movement of paper or other movement in the machine that occurs each time a copy is made. In this manner, the count state of the counter is incremented each time a copy has been made, and the next copy will be imprinted with the next consecutive number.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. Apparatus for sequentially numbering copies produced by a photocopy machine having a transparent panel for receiving materials to be copied and a cover for closure on the materials received on the panel, said apparatus comprising:

a chase having a size and shape to be received on the transparent panel on top of the material to be copied between the cover of the machine and the material to be copied, said chase being detachable from the photocopy machine and being separable from the machine and from said cover;

a counter head carried on said chase and providing a numerical display of the current numerical count state of the counter head, said display being at a location to be exposed to the transparent panel when the chase is received thereon to effect copying of the count state of the counter onto each copy produced by the photocopy machine; and means for incrementing the count state of said display each time a preselected number of copies have been produced by the machine.

2. Apparatus as set forth in claim 1, wherein said chase comprises a plurality of chase sections detachably connected with one another, at least some of said chase sections having a different size than others.

3. Apparatus as set forth in claim 2, wherein:

each of said chase sections has a pair of opposite edges; and one edge of each chase section presents a groove and the other edge of each chase section presents a tongue adopted to fit closely in the groove of other sections.

4. Apparatus as set forth in claim 1, wherein said chase comprises a plurality of separable chase sections detachably connected with one another, said counter head being carried on one of said chase sections.

5. Apparatus as set forth in claim 4, wherein said one chase section is constructed to interfit with the other chase sections in a manner to be located at a plurality of different positions on the chase, thereby permitting the count state of the counter head to be copied onto each copy at a plurality of different locations thereon.

6. Apparatus as set forth in claim 4, wherein:

each chase section has a pair of opposite edges;

one edge of each chase section presents a groove and the opposite edge presents a tongue which fits closely and removably in the groove of an adjacent section; and said one chase section has four edges, two of which present grooves and two of which present tongues, thereby permitting said one section to assume two different rotative positions on the chase offset by 90° from one another.

7. Apparatus as set forth in claim 1, wherein:

the photocopy machine includes a light source which is energized to apply light to the transparent panel during production of each copy produced by the machine; and said incrementing means comprises a light sensor on the chase for sensing the light from the light source and effecting incrementing of the count state each time light is sensed.

8. Apparatus as set forth in claim 7, wherein:

said chase comprises a plurality of chase sections detachably connected with one another;

said counter head is carried on one of said chase sections; and said light sensor is carried on another of said chase sections at a location exposed to the transprent panel.

9. Apparatus as set forth in claim 8, wherein:

said other chase section presents an internally threaded passage therethrough; and said light sensor is mounted on an externally threaded mounting element threaded into said passage.

10. Apparatus for printing sequential numbers on successive copies made by a photocopier having a transparent panel for receiving material to be copied, a cover for closure on the material received on the panel and a light bar swept along the panel each time a copy is made, said apparatus comprising:

a chase having a size and shape to be received on the transprent panel on the material to be copied, said chase being removable from the photocopy machine and being separable from the machine and said cover;

a counter having a counter head on the chase, said counter head providing a numerical display of the current count state of the counter at a location exposed to the transparent panel when the chase is received thereon, to effect copying of the count state of the counter from said display onto each copy made by the photocopier;

a light sensor on the chase at a location exposed to the light bar to sense each sweep of the light bar along the panel; and means for incrementing the count state of the counter each time said sensor senses a sweep of the light bar along the panel, to effect consecutive numbering of successive copies made by the photocopier.

11. Apparatus as set forth in claim 10, wherein said chase comprises a plurality of chase sections detachably connected with one another, at least some of said chase sections having a different size than others.

12. Apparatus as set forth in claim 11, wherein:

each of said chase sections has a pair of opposite edges; and one edge of each chase section presents a groove and the other edge of each chase section presents a tongue adapted to fit closely in the groove of other sections.

13. Apparatus as set forth in claim 10, wherein said chase comprises a plurality of separable chase sections detachably connected with one another, said counter head being carried on one of said chase sections.

14. Apparatus as set forth in claim 13, wherein said chase section is constructed to interfit with the other chase sections in a manner to be located at a plurality of different positions on the chase, thereby permitting the count state of the counter head to be copied onto each copy at a plurality of different locations thereon.

15. Apparatus as set forth in claim 13, wherein:

each chase section has a pair of opposite edges;

one edge of each chase section presents a groove and the opposite edge presents a tongue which fits closely and removably in the groove of an adjacent section; and said one chase section has four edges, two of which present grooves and two of which present tongues, thereby permitting said one section to assume two different rotative positions on the chase offset by 90° from one another.

16. In combination with a photocopier having a transparent panel for receiving material to be copied, a cover for closure on the material on the panel and a light source for applying light to the panel to make a copy of the material thereon, a number printing device comprising:

a chase adapted to be placed on the material received on the transparent panel, said chase being removable from the photocopier and being separable from the photocopier and cover;

a counter having a counter head carried on the chase, said counter head providing a numerical display of the count state of the counter at a location exposed to the transparent panel when the chase is placed on the material on the panel whether or not the cover is closed;

a light sensor carried on the chase at a location exposed to the light applied to the panel by the light source, said sensor providing a signal each time the light source is activated to make a copy of the material on the panel; and means for incrementing the count state of the counter in response to each signal provided by the sensor, whereby successive copies made by the photocopier are numbered consecutively by copying of the display onto each copy.

17. Apparatus as set forth in claim 16, wherein said chase comprises a plurality of separable chase sections detachably connected with one another, said counter head being carried on one of said chase sections.

18. Apparatus as set forth in claim 17, wherein said one chase section is constructed to interfit with the other chase sections in a manner to be located at a plurality of different positions on the chase, thereby permitting the count state of the counter head to be copied onto each copy at a plurality of different locations thereon.

19. Apparatus as set forth in claim 17, wherein:

each chase section has a pair of opposite edges;

one edge of each chase section presents a groove and the opposite edge presents a tongue which fits closely and removably in the groove of an adjacent section; and said one chase section has four edges, two of which present grooves and two of which present tongues, thereby permitting said one section to assume two different rotative positions on on the chase offset by 90° from one another.

20. Apparatus as set forth in claim 16, wherein:

said chase comprises a plurality of chase sections detachably connected with one another;

said counter head is carried on one of said chase sections; and said light sensor is carried on another of said chase sections at a location exposed to the transparent panel.

* * * * *